United States Patent [19]
Vohr et al.

[11] Patent Number: 4,597,676
[45] Date of Patent: Jul. 1, 1986

[54] HYBRID BEARING

[75] Inventors: John H. Vohr, Schenectady; William H. Miller, Albany; Jeffrey J. Perkins, Fultonville, all of N.Y.

[73] Assignee: General Electric Company, Schenectady, N.Y.

[21] Appl. No.: 605,447

[22] Filed: Apr. 30, 1984

[51] Int. Cl.[4] .............................................. F16C 17/03
[52] U.S. Cl. ..................... 384/114; 384/117; 384/309; 384/311; 384/406; 384/448
[58] Field of Search ................. 384/99, 100, 111, 114, 384/117–120, 122, 306–312, 406, 448; 308/1 A

[56] References Cited

U.S. PATENT DOCUMENTS

| | | | |
|---|---|---|---|
| 2,063,570 | 12/1936 | Wallgren | 384/312 |
| 3,297,371 | 1/1967 | Salzman | 384/312 |
| 3,544,179 | 12/1970 | De Leu | 384/406 X |
| 3,687,510 | 8/1972 | Cooper | 384/311 |
| 3,824,579 | 7/1974 | Waseleski, Jr. et al. | 308/1 A X |
| 3,887,245 | 6/1975 | Rouch | 384/306 X |

Primary Examiner—Stuart S. Levy
Assistant Examiner—David Werner
Attorney, Agent, or Firm—Jerome C. Squillaro; Paul Checkovich

[57] ABSTRACT

A hybrid bearing for a horizontal rotatable shaft includes an upper portion which is essentially a half section of a fixed arc journal bearing. The lower portion of the bearing is essentially the lower portion of a tilting pad bearing. Appropriate modifications are made to the oil film and drain lines and other peripheral elements to accommodate the hybrid nature of the bearing. The resultant bearing has the low power loss characteristics of the journal bearing, and additionally, the stability characteristics of a tilting pad bearing.

15 Claims, 8 Drawing Figures

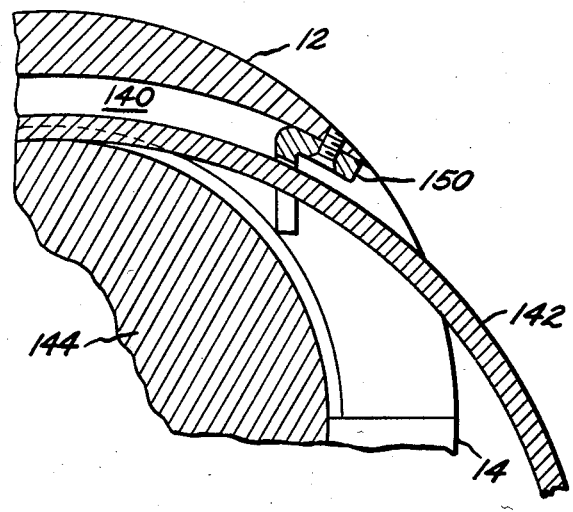
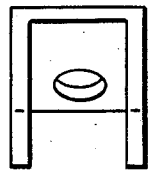
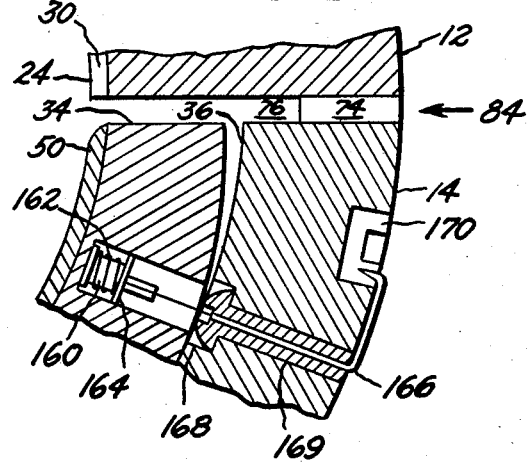

HYBRID BEARING

BACKGROUND OF THE INVENTION

This invention relates generally to a bearing for a horizontally oriented rotatable shaft, and in particular to a hybrid bearing which incorporates the desirable characteristics of a journal bearing and a tilting pad bearing.

It is well known in the art that fixed arc, cylindrical journal bearings have low power loss characteristics and are relatively easy to manufacture. However, these fixed arc journal bearings exhibit relatively poor dynamic characteristics. In particular, these journal bearings are susceptible to a form of self excited vibration known as "oil whirl" caused by cross coupling stiffness characteristics of the bearing. As is well recognized, a film of oil flows between the rotating shaft and the inner surface of the fixed arc journal bearing. Cross coupling stiffness characteristics of the bearing result from the fact that the vector forces generated in this oil film by displacements of the rotating shaft are not in line with the shaft displacements.

Tilting pad bearings, which include a plurality of pads circumferentially placed about the shaft and pivotably mounted within the bearing casing, minimize the cross coupling vector forces contributing to the "oil whirl" phenomenon. The radially outer surface of each tilting pad normally has a smaller radius of curvature than that of the inner surface of the bearing casing thereby allowing the pad to pivot or tilt in response to movement by the shaft. Since the pad can pivot, it follows that the net oil film force for each pad must be centered over the pivot. This tends to result in oil film forces which are in line with shaft displacements i.e., tends to minimize cross coupling forces. However, tilting pad bearings do experience a relatively high power loss, in the range of 25-30% higher than the power loss experienced by fixed arc, cylindrical journal bearings. Also, tilting pad bearings are relatively more expensive to manufacture than the cylindrical journal bearings.

When the shaft is relatively horizontally oriented, the upper, unloaded tilting pads may rock excessively or pivot which causes fretting or wear at the pivotal contact portions of the radially outer surface of the tilting pad and/or the adjacent portions of the inner surface of the bearing casing. An article in Power Engineering, on November, 1982, discloses what appears to be a four pad tilting bearing. A close review of the article supports this description of FIG. 4, on page 64, which shows the end casing above the horizontal section line and two tilting pad bearings as a cutaway view below the horizontal section line.

OBJECTS OF THE INVENTION

It is an object of this invention to provide a hybrid bearing utilizing the best operating characteristics of both a fixed arc journal bearing and a tilting pad bearing.

It is another object of the present invention to provide for a hybrid bearing which requires a modest flow of lubricant oil supplied thereto to support the shaft on a film of oil.

It is a further object of the present invention to provide for a hybrid bearing which minimizes the cross coupling effect in the journal bearing portion.

SUMMARY OF THE INVENTION

Briefly stated in accord with a preferred embodiment of our invention we provide a hybrid bearing for a horizontal rotatable shaft including an upper portion which is essentially a half section of a fixed arc journal bearing. The lower portion of the bearing is essentially the lower portion of a tilting pad bearing. Appropriate modifications are made to the oil film and drain lines and other peripheral elements to accommodate the hybrid nature of the bearing. The resultant bearing has the low power loss characteristics of the journal bearing, and additionally, the stability characteristics of a tilting pad bearing.

BRIEF DESCRIPTION OF THE DRAWING

The subject matter which is regarded as the invention is particularly pointed out and distinctly claimed in the concluding portion of the specification. The invention, however, together with further objects and advantages thereof, may best be understood by reference to the following description taken in connection with the accompanying drawings in which:

FIG. 6 is a cutaway view of a portion of the bearing including the oil ring and an oil scraper;

FIG. 7 illustrates a cross sectional view of the oil scraper; and

FIG. 8 illustrates a partial cutaway view of one of the tilting pad bearings including a temperature sensor and leads extending through the bearing casing.

One embodiment of the hybrid bearing includes an upper and a lower semicylindrical section. The sections are joinable longitudinally to encase a horizontally oriented rotatable shaft. A fixed arc journal bearing surface is formed by the radially inner portions of the upper semicylindrical section. The hybrid bearing includes at least a pair of arcuate tilting pads, each pad being circumferentially displaced about the shaft and movably mounted within the lower semicylindrical section. The fixed arc bearing surface and each pad bearing surface is in close proximity to the shaft, yet spaced therefrom. Oil is supplied to the hybrid bearing and the bearing includes means for channeling the oil through the upper and lower semicylindrical sections to the fixed arc bearing surface and the tilting pad bearing surfaces. The hybrid bearing may also include a circumferential oil overshoot groove which axially separates the fixed arc bearing surface into fore and aft portions.

In another embodiment, the hybrid bearing includes two circumferential cutouts at each axial end adjacent to but spaced from the axial extremes of the fixed arc bearing surface and the tilting pad bearing surfaces. An oil seal band is disposed in each of the cutouts. Another embodiment of the hybrid bearing includes an arcuate, radially aligned slot open to the oil overshot groove in the upper semicylindrical section and also open to the exterior of that section. A rotatable oil ring, having a greater radial dimension than the shaft, is disposed in the slot and lies on the shaft to provide oil to the interior of the hybrid bearing.

DETAILED DESCRIPTION OF THE INVENTION

This invention relates generally to bearings capable of supporting on a film of oil a horizontally oriented, rotating shaft, and particularly relates to a hybrid bearing which includes features of a fixed arc journal bearing and a tilting pad bearing.

Figure 1:
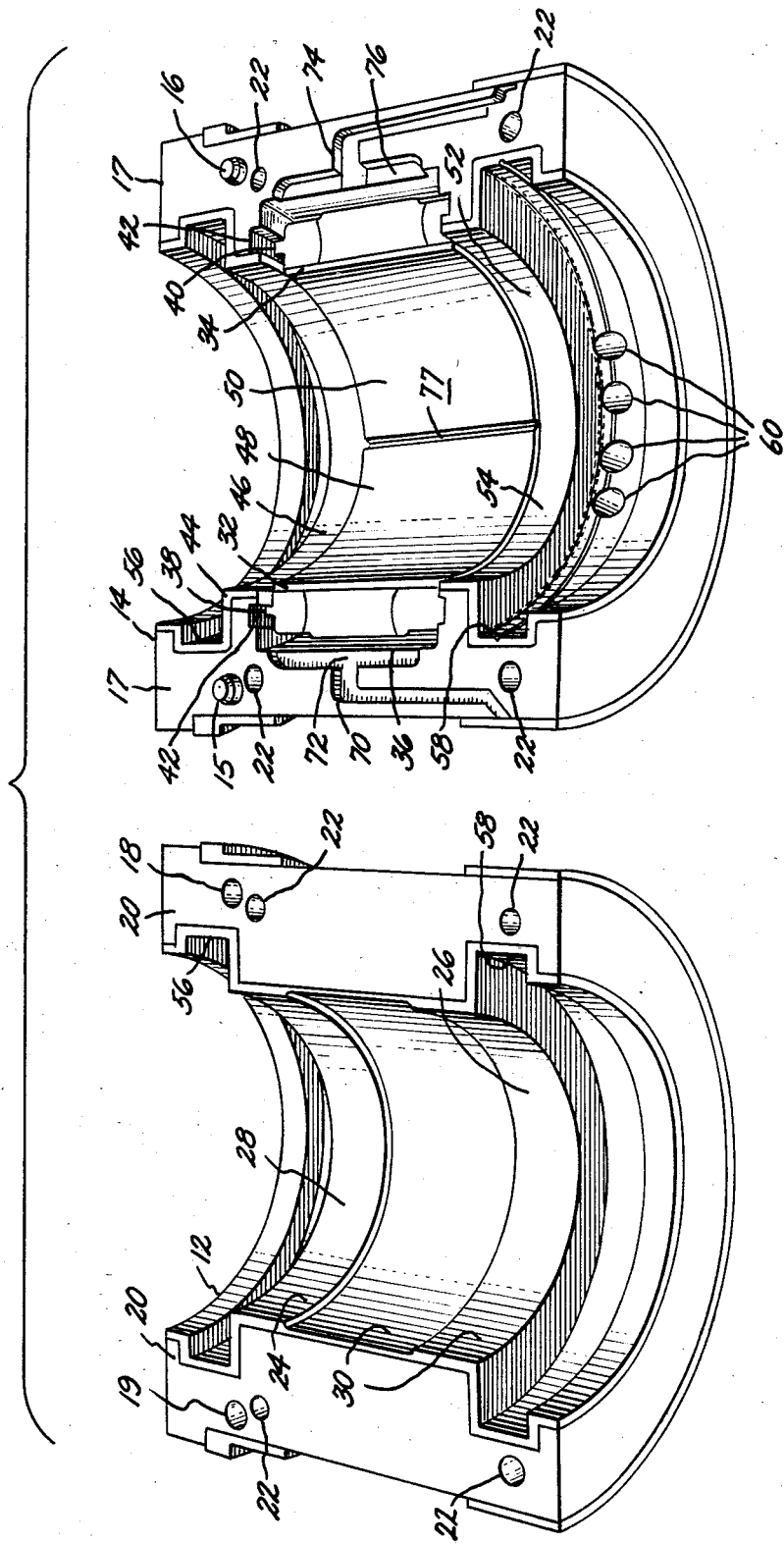
FIG. 1 is a perspective view of a disassembled hybrid bearing of the present invention.

FIG. 1 illustrates a perspective view of the hybrid bearing 10 disassembled. Bearing 10 includes an upper semicylindrical section 12 and a lower semicylindrical section 14 being joinable longitudinally to encase an axial portion of the horizontally oriented, rotatable shaft therebetween (the shaft is not shown in FIG. 1). Pins 15 and 16 extend from flat surface 17 of section 14 and are matable with pin holes 18 and 19 extending into flat surface 20 of section 12. The upper semicylindrical section may be joined to the lower semicylindrical section by any well known means. In this illustrated embodiment, bolt holes 22 through both sections 12 and 14 provide access for a bolting means, not illustrated.

A fixed arc journal bearing surface 24 is formed by the radially inner portions of upper semicylindrical section 12. In the embodiment illustrated in FIG. 1, bearing surface 24 includes fore portion 26 and an aft portion 28. Surface 24 includes a circumferential oil overshoot groove 30 which axially separates fore surface portion 26 from aft surface portion 28. It should be noted that although FIG. 1 illustrates fixed arc bearing surface 24 as including groove 30, surface 24 need not necessarily include groove 30 as illustrated in FIG. 1.

Lower semicylindrical section 14 includes at least a pair of arcuate tilting pads 32 and 34. It is to be recognized that section 14 may include more than two tilting pads as is well known in the art. Each pad 32, 34 is circumferentially displaced about the shaft, which is not shown but is encased between section 12 and section 14, and each pad is movably mounted within section 14. Pad 32 is pivotably mounted within section 14 for pivotal action along inner surface 36 of section 14. Primarily pad 32 pivots radially as does pad 34. Axial extenders 38 and 40 from pads 32 and 34, respectively, loosely fit into axial groove 42 in land 44 of section 14. Land 44 has a radially inner surface 46 which has a slightly greater radial dimension than tilting pad bearing surfaces 48 and 50 of pad 32 and 34 respectively. Similarly, land 52, which is axially opposite land 44, has surface 54 having a greater radial dimension than pad bearing surfaces 48 and 50.

Axially outbound from lands 44 and 54 are circumferential oil drain grooves 56 and 58 cut into both section 12 and section 14. As illustrated, the axial extent of fore and aft portions 26 and 28 of section 12 match the axial extent of lands 44 and 52. At the bottom of groove 58 is illustrated a plurality of oil drain holes 60 which allow oil to drain from bearing 10. A similar set of holes, not shown in FIG. 1, communicate with groove 56.

Figure 2:
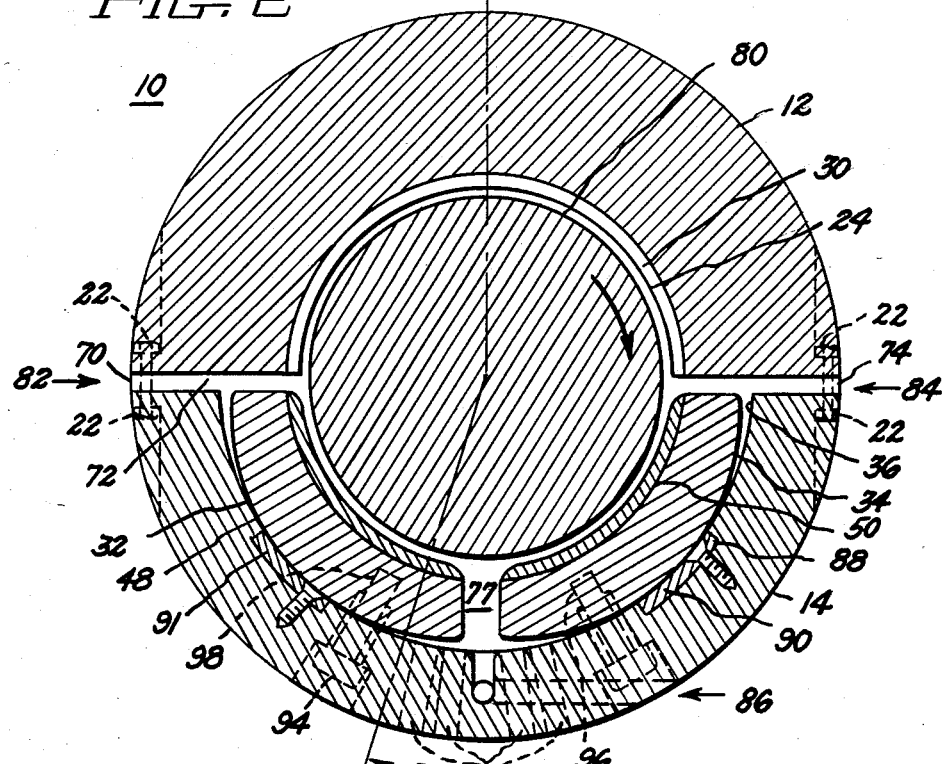
FIG. 2 is the axial view of the hybrid bearing of FIG. 1.

As is well recognized in the art, it is important to space all the bearing surfaces slightly away from the shaft. See FIG. 2 for this spacing. This spacing allows for a thin film of oil to flow therebetween. If the oil film is eliminated, the shaft "wipes" the bearing and detrimental consequences occur which are well known to those of ordinary skill in the art including removing the soft material or "babbit" which coats the bearing faces. Hence, fixed arc, journal bearing surface 24 is in close proximity to the shaft yet spaced apart therefrom to allow oil to flow through the interstice between the bearing surface and the shaft. Assuming clockwise rotation of the shaft in bearing 10, oil is supplied to surface 24 through oil supply channel 70 which extends from the exterior of section 14 to a relatively wide axial delivery channel 72 proximite both the leading edge of surface 24 and the trailing edge of pad 32. Similarly oil delivery channel 74, oppositely disposed to delivery channel 70, allows a supply of pressurized oil into section 14 via delivery channel 76 to the leading edge of pad 34. Illustrated in FIG. 2 is a third oil channel and delivery channel capable of supplying oil to gap 77 between pad 32 and pad 34, thereby supplying oil to the leading edge of pad 32. As used herein, the terms "leading" and "trailing" refer to portions of the items first affected by a certain fixed point on a shaft rotating clockwise. In a preferred embodiment, oil overshoot groove 30 is approximately four times the radial dimension of the interstice between the rotating shaft and bearing surface 24.

FIG. 2 illustrates an axial view of hybrid bearing 10. Reference numerals designating similar items described in FIG. 1 have been carried through the entire specification and drawings. FIG. 2 illustrates a shaft 80 encased within bearing 10. The interstice between shaft 80 and surface 24 of section 12 is exaggerated for illustration. However, one of ordinary skill in the art would recognize if oil under pressure is introduced at point 82, an oil film would flow between surface 24 and shaft 80 about the upper portion of bearing 10. Likewise, if oil under pressure was introduced at points 84 and 86, shaft 80 would be supported on a film of oil by pad bearing surfaces 48 and 50 of tilting pads 32 and 34, respectively. Pad 34 pivotably reacts about a pivotal contact portion 88 of surface 36. A hardened liner 90 is mounted into a recess in surface 36 proximate to pivotal contact portion 88. A similar liner 91 is illustrated for pad 32. The liners also alleviate substantial reworking of inner surface 36 of section 14 after extended usage of the bearing. A pair of antirotation pins 92 and 94 restrict the circumferential movement of pads 34 and 32 respectively. The antirotation pins are fixed to section 14 in a manner well known in the art, and extend into corresponding radial holes 96, 98 extending from the radially outer surfaces of pads 34 and 32.

In operation, it is believed cross coupling forces along the fixed arc journal bearing surface 24 may be alleviated by overshoot groove 30. Also, groove 30 operates to carry over oil supplied at point 82 across the semicircular expanse of section 12 to the leading edge of pad 34. This oil carry over is believed to decrease the oil flow requirements for pad 34. Hence, experiments have shown that an oil flow on the order of one gallon per minute for a 3600 RPM loaded shaft of 5 inch diameter provides an adequate flow of lubricant oil to this hybrid bearing. The prior art devices generally teach that one gallon per minute oil flow is required for each pad, thereby translating into a three gallon per minute requirement for such a bearing. As is well known in the art, all the bearing surfaces, 24, 48 and 50, are normally covered with a layer of babbitt.

Figure 3:
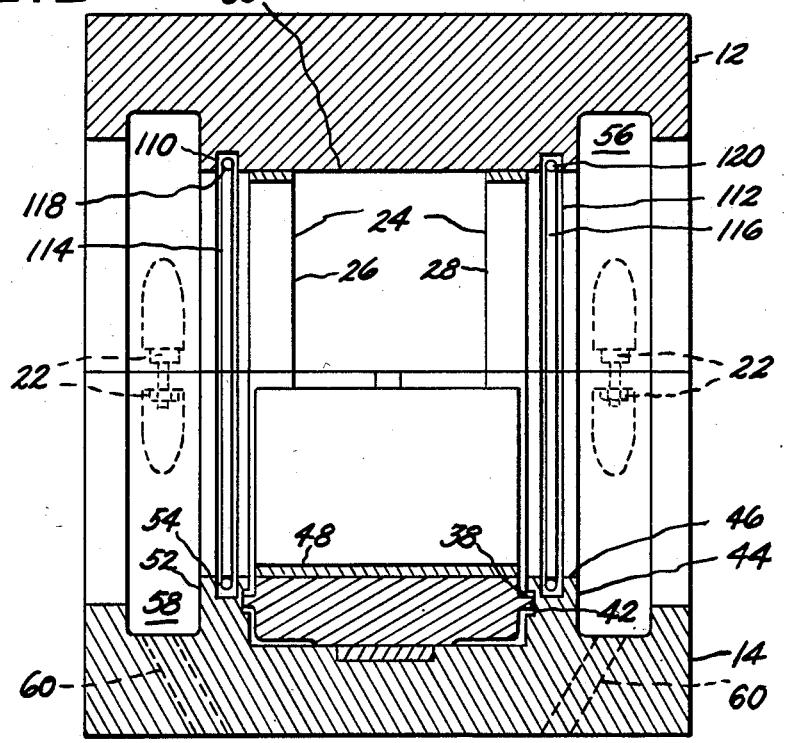
FIG. 3 is a radial view of a different embodiment of the hybrid bearing as generally viewed along section lines 3—3 of FIG. 2.

FIG. 3 is a radial view of an alternate embodiment of the hybrid bearing generally viewed from the perspective of section line 3—3 in FIG. 2. For clarity, similar reference numerals designate similar items in FIG. 3.

There are two main distinctions between the hybrid bearing illustrated in FIG. 3 and the bearing 10 illustrated in FIGS. 1 and 2. The first relates to the axial dimensions of fixed arc journal bearing 24 in relation to the axial dimension of the tilting pad bearing surface 48. Generally in FIGS. 1 and 2, bearing 10 has fore and aft fixed arc bearing surfaces 26 and 28, respectively, extending outbound axially beyond the tilting pad bearing surfaces 48 and 50. This point will be described and explained with relationship to FIG. 4 which follows. The second point of difference relates to a pair of oil seal bands at each axial end of the bearing as illustrated in FIG. 3. Section 12 and 14 include two circumferential cutouts 110 and 112 at each axial end of the bearing. Cutouts 110 and 112 are adjacent to but spaced apart from the axial extremes of the fixed arc bearing surface 24 and the tilting pad bearing surface 48. An oil seal band 114 is loosely disposed in cutout 110 as is an oil seal band 116 in cutout 112. Oil seal band 114 and 116 are split bands with a biasing means along their outer periphery providing a radially inward force along that periphery. Such biasing means are well known in the art, however, in FIG. 3 the illustrated biasing means are springs 118 and 120 affecting bands 114 and 116 respectively. The band's inner periphery is forced in close proximity to the shaft which runs from left to right in FIG. 3, but is not illustrated in that Figure for clarity. Generally bands 114 and 116 limit the axial flow of oil outbound from all the bearing surfaces. Of course, if the pressure of the oil inboard of the bands is sufficiently high, the oil is forced past bands 114, 116 and into oil drain grooves 58 and 56, and is drained from the bearing through drain holes 60.

As is well known in the art, tilting pad bearings may pivotally react in an axial sense. As illustrated, tilting pad 32 pivotally reacts in an axial sense along axial pivotal contact portion 122.

Figure 4:
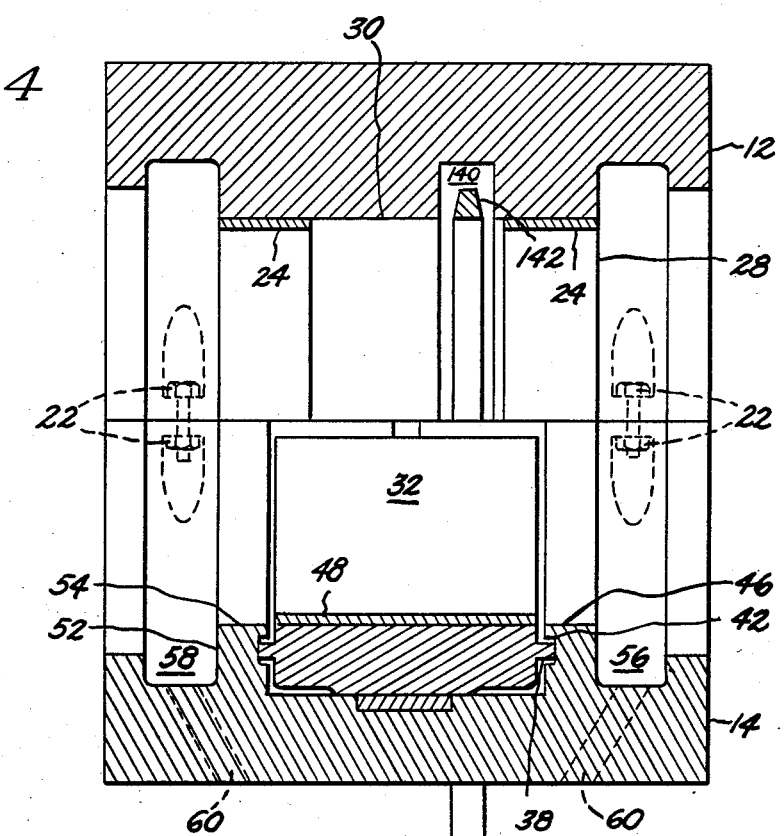
FIG. 4 is a cross sectional radial view of another embodiment of the present invention including an oil ring.

FIG. 4 illustrates another embodiment of a hybrid bearing from a radial view generally from the same perspective as viewed along sectional lines 3—3 of FIG. 2, however, FIG. 4 illustrates a slightly different embodiment of the present invention. Fore bearing surface portion 26 axially extends outboard beyond bearing surface 48 as does aft bearing surface portion 28. In this embodiment, lands 52 and 44 are semicircular. In this embodiment, fore portion 26 and aft portion 28 are believed to act as a sealing means to retain the oil within overshoot groove 30.

Figure 5:
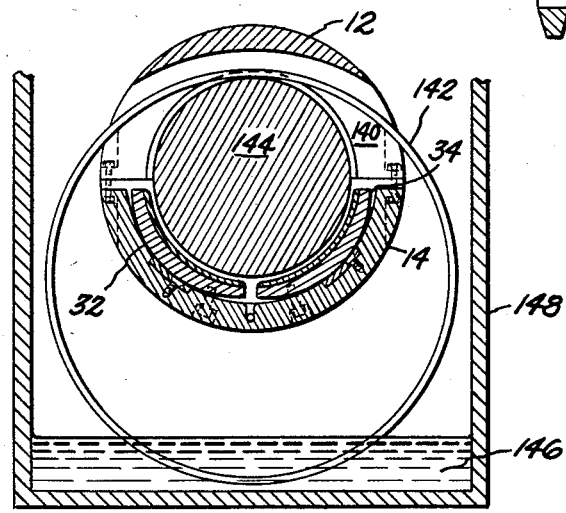
FIG. 5 is a cross sectional axial view of a hybrid bearing including the oil ring.

Upper semicylindrical section 12 includes an arcuate radially aligned slot 140 open to groove 30 and also open to the exterior of section 12. See FIGS. 4 and 5. Disposed in slot 140 is a rotatable oil ring 142. FIG. 5 illustrates oil ring 142 having a greater radial dimension than shaft 144. Also illustrated in FIG. 5 is an oil reservoir 146 contained by structure 148 adjacent to but outside of the hybrid bearing. Ring 142 lies on shaft 144 and provides oil to the interior of upper and lower semicylindrical sections 12 and 14 by passing through oil reservoir 146 and carrying the oil upwards and into the bearing through slot 140.

FIG. 6 illustrates an oil scraper affixed to section 12 within slot 140. An oil scraper 150 is one illustrated means for scraping oil from oil ring 142 thereby increasing the oil delivered to the interior of the hybrid bearing. FIG. 7 details the general configuration of one possible oil scraper 150.

FIG. 8 details a temperature probe inserted into tilting pad 34. Temperature probe 160 may be any resistance temperature, thermocouple or other suitable temperature measuring device well known in the art. Probe 160 is maintained in relatively close proximity to bearing surface 50 by being biased towards that surface by spring 162 and associated plug 164. Wires 166 extend from probe 160 outward through hole 168 and bolt 169. Wires 166 run to receptacle plug 170 recessed into section 14.

This invention is not meant to be limited by a single oil ring as illustrated in FIGS. 4, 5 and 6 herein. As is well known in the art, the bearing may include several oil rings with a relatively complicated scraper means or other device to reduce the oil carried by the oil ring outside of the bearing casing. The axial length of the fixed arc journal bearing surface in relation to the tilting pad bearing surface is not meant to be limiting. Also, a person of ordinary skill in the art would recognize that some features described herein with respect to the tilting pads may be omitted and still achieve proper operation of a tilting pad bearing, likewise, other items and features may be added to the tilting pad bearings described herein to further improve their operating characteristics. The breadth and scope of the appended claims is meant to cover a hybrid bearing which utilizes an upper fixed arc journal bearing surface and lower tilting pad journal bearing surfaces. The claims appended hereto are meant to cover all modifications described herein as well as those modifications readily apparent to those of ordinary skill in the art.

We claim:

1. A hybrid bearing for supporting a horizontally oriented, rotatable shaft on a film of oil, comprising:

a housing for encasing an axial portion of said shaft, said housing having an upper and a lower portion;

a fixed arc journal bearing disposed in the upper portion of said housing, said fixed arc bearing having a surface operationally disposed in close proximity to yet spaced from said shaft to allow oil to flow through the interstice between said fixed arc bearing surface and said shaft;

at least a pair of arcuate tilting pads each pivotably disposed in the lower portion of said housing, each said pad operationally circumferentially disposed about a portion of said shaft, and each said pad having a pad bearing surface operationally including the film of oil and operationally disposed in close proximity to yet spaced from said shaft to support the rotating shaft on the film of oil; and means for channeling said oil to said fixed arc bearing surface and said tilting pad bearing surfaces, said means for channeling disposed between the leading edge of the fixed arc journal bearing surface and the proximate pad.

2. A hybrid bearing as in claim 1 wherein said fixed arc bearing surface includes a circumferential oil overshoot groove which axially separates said fixed arc bearing surface into a fore and an aft portion.

3. A hybrid bearing as in claim 2 wherein said fore and aft fixed arc bearing surface portions respectively extend outbound axially beyond said pair of tilting pads bearing surfaces.

4. A hybrid bearing as in claim 2 wherein each of said tilting pads is disposed for pivotal reaction both radially and axially along an inner surface of said lower portion of said housing;

each of said tilting pads having a hole radially extending from its radially outer surface into said tilting pad;

said lower portion of said housing including a pair of hardened liners mounted into recesses in portions of the inner surface of said lower portion proximate respective the pivotal contact portions of said radially outer surfaces of each tilting pad; and a pair of anti-rotation pins, one of said pins associated with a respective one of said tilting pads and being fixed to said lower portion of said housing and extending into the corresponding hole in said one tilting pad.

5. A hybrid bearing as in claim 2 wherein said upper and lower portion of said housing including two circumferential cut-outs, one of said cut-outs at each axial end adjacent to yet spaced from the axial extremes of said fixed arc bearing surface and said tilting pad bearing surfaces, and said hybrid bearing further including:

a pair of oil seal bands, one of said bands disposed in each of said cut-outs and means for biasing the outer periphery of each of said bands radially inward for operationally disposing the inner periphery of each band in sealing engagement with said shaft.

6. A hybrid bearing as in claim 2, 3 or 4 wherein oil is supplied in a reservoir adjacent to yet outside of said hybrid bearing, said upper portion of said housing having an arcuate, radially aligned slot open to said oil overshoot groove and further open to the exterior of said upper portion of said housing, said shaft up to 5 inches in diameter, said hybrid bearing further including:

a rotatable oil ring having a greater radial dimension than said shaft, said oil ring disposed in said slot and operationally coupled to said shaft for providing oil to the interior of said upper and lower portion of said housing by passing through said oil reservoir and carrying said oil into said bearing.

7. A hybrid bearing as in claim 6 further including:

means for scraping said oil from said oil ring, said scraping means affixed to said upper portion of said housing, said means for scraping for minimizing flow of oil by said oil ring from the upper portion of said housing to the reservoir.

8. A hybrid bearing as in claim 1, 2, 3, 4 or 5 further comprising a temperature probe coupled to one of said at least two pads, said probe extending into said pad, spaced from the pad bearing surface and biased toward the bearing pad surface.

9. The bearing as in claim 8, further including a screw having a longitudinal hole therethrough, said screw disposed in said lower portion of said housing for permitting electrical coupling of said probe to the outer periphery of said lower portion through said longitudinal hole.

10. A hybrid bearing as in claim 6, further comprising a temperature probe coupled to one of said at least two pads, said probe extending into said pad, spaced from the pad bearing surface and biased toward the bearing pad surface.

11. The bearing as in claim 10, further including a screw having a longitudinal hole therethrough, said screw disposed in said lower Portion of said housing for permitting electrical coupling of said probe to the outer periphery of said lower portion through said longitudinal hole.

12. A hybrid bearing for supporting a horizontally oriented rotatable shaft on a film of oil, comprising:

a housing for encasing an axial portion of the shaft, said housing having an upper and a lower portion;

a journal bearing having a predetermined arcuate portion disposed in the upper portion of said housing, said journal bearing further having a surface operationally disposed in close proximity to yet spaced from the shaft for permitting oil to enter the space between said journal bearing and the shaft;

at least two arcuate tilting pads, each tilting pad pivotably disposed in the lower portion of said housing, each said pad operationally circumferentially disposed about a portion of the shaft, and each said pad having a bearing surface operationally disposed in close proximity to yet spaced from the shaft for supporting the shaft on the film of oil to be operationally disposed between the shaft and the bearing surface of each pad;

oil delivery means coupled to said journal bearing and disposed between the predetermined arcuate portion and the proximate pad, said oil delivery means delivering oil to the leading edge of said predetermined arcuate portion; and a temperature probe coupled to one of said at least two pads, said probe extending into said pad, spaced from the pad bearing surface and biased toward the bearing pad surface.

13. The bearing as in claim 12 wherein the shaft is up to 5 inches in diameter and further wherein said oil delivery means includes a rotatable oil ring having a greater radial dimension than the shaft, said oil ring operationally overlying the shaft for providing oil to said bearing from a reservoir of oil, at least portion of said oil ring operationally disposed in the oil of the reservoir.

14. The bearing as in claim 13 wherein the shaft is 5 inches in diameter.

15. The bearing as in claim 12 further including a screw having a longitudinal hole therethrough, said screw disposed in said lower portion of said housing for permitting electrical coupling of said probe to the outer periphery of said lower portion through said hole.

* * * * *